United States Patent
White et al.

(10) Patent No.: US 6,727,620 B2
(45) Date of Patent: Apr. 27, 2004

(54) APPARATUS AND METHOD FOR A DUAL DRIVE AXLE

(75) Inventors: Chris D. White, Charlotte, NC (US); Roger G. Ormsby, Watertown, NY (US); Stan J. Morczek, Constableville, NY (US); Douglas P. Valin, Dexter, NY (US)

(73) Assignee: Stature Electric, Inc., Watertown, NY (US)

( * ) Notice: Subject to any disclaimer, the term of this patent is extended or adjusted under 35 U.S.C. 154(b) by 392 days.

(21) Appl. No.: 09/974,095

(22) Filed: Oct. 10, 2001

(65) Prior Publication Data

US 2003/0067234 A1 Apr. 10, 2003

(51) Int. Cl.$^7$ ................................................ H02K 7/12
(52) U.S. Cl. ....................... 310/112; 310/114; 310/40 R
(58) Field of Search ................................. 310/112, 114, 310/40 R, 101, 48

(56) References Cited

U.S. PATENT DOCUMENTS

| | | | | |
|---|---|---|---|---|
| 3,168,665 A | * | 2/1965 | Holper | 310/112 |
| 3,517,566 A | * | 6/1970 | Cornford | 74/411 |
| 4,494,025 A | * | 1/1985 | Fickler | 310/80 |
| 4,502,559 A | * | 3/1985 | Makitalo et al. | 180/344 |
| 4,856,368 A | * | 8/1989 | Fujisaki et al. | 74/606 R |
| 4,879,484 A | * | 11/1989 | Huss | 310/114 |
| 5,117,141 A | * | 5/1992 | Hawsey et al. | 310/114 |
| 5,281,880 A | * | 1/1994 | Sakai | 310/115 |
| 5,300,848 A | * | 4/1994 | Huss et al. | 310/83 |
| 5,506,453 A | * | 4/1996 | McCombs | 290/44 |
| 5,703,423 A | * | 12/1997 | Fukao et al. | 310/90.5 |
| 5,838,085 A | * | 11/1998 | Roesel et al. | 310/113 |
| 5,856,714 A | * | 1/1999 | Sugiura | 310/49 R |
| 5,868,215 A | | 2/1999 | Kawada et al. | |
| 5,947,404 A | | 9/1999 | Dolgas et al. | |
| 5,994,811 A | * | 11/1999 | Thomassen | 310/160 |
| 6,025,660 A | * | 2/2000 | Guerin | 310/49 R |
| 6,034,456 A | * | 3/2000 | Osama et al. | 310/90.5 |
| 6,075,300 A | * | 6/2000 | Moss et al. | 310/136 |
| 6,089,341 A | * | 7/2000 | Gingerich | 180/65.1 |
| 6,140,734 A | | 10/2000 | Hazelton et al. | |
| 6,166,469 A | * | 12/2000 | Osama et al. | 310/90.5 |
| 6,222,288 B1 | | 4/2001 | Benito Izquierdo | |
| 6,246,133 B1 | * | 6/2001 | Embree et al. | 310/47 |
| 6,278,197 B1 | | 8/2001 | Appa | |
| 6,476,513 B1 | * | 11/2002 | Gueorguiev | 290/55 |
| 6,664,694 B2 | * | 12/2003 | Yang | 310/191 |

FOREIGN PATENT DOCUMENTS

JP 9132042 * 5/1997 ........... B60K/17/04

* cited by examiner

Primary Examiner—Nicholas Ponomarenko
Assistant Examiner—Heba Elkassabgi
(74) Attorney, Agent, or Firm—Robert J. Sinnema; Bond, Schoeneck & King, PLLC

(57) ABSTRACT

An axle drive apparatus includes a first rotor assembly with a first output shaft and a second rotor assembly with a second output shaft for providing independent rotation of the first and second output shafts. There also includes a first and second conductive assembly for, respectively, conducting electrical current into a inducing rotation of the first and the second rotor. Finally, an axial housing commonly connects the first and second rotor and the first and second brush card assembly.

A method of operating an axle drive apparatus includes supplying current to a first conductive and second conductive assembly, respectively, to conduct the current into and inducing rotation of a first and second rotor assembly. Then the axle drive is operated by engaging a first rotor assembly and a second rotor assembly, respectively, providing independent rotation of a first and a second output shaft.

42 Claims, 4 Drawing Sheets

APPARATUS AND METHOD FOR A DUAL DRIVE AXLE

FIELD OF THE INVENTION

The present invention relates to dual axles, and more particularly to dual drive axles, which are used, for example, in electric powered vehicles like wheelchairs.

BACKGROUND OF THE INVENTION

Manufacturers use two separate motors to improve maneuverability of electric powered vehicles or drive elements requiring independent control. For example, an electric lawn and garden tractor has independent electric motors for both driven wheels. The independent motors include separate reduction gearboxes and their wheels mounted on the output shaft of the gearboxes. The motors are controlled independently to allow each wheel to rotate at different speeds or in opposite directions. The power to the motors is controlled by an electric controller independent of the wheel, as to speed, with the power being increase or decreased in accordance with whether the wheels are under running or over running, relative to a manually-controlled speed setting. This allows a tight turning radius, that is, a zero turning radius when desired.

In electric motors the armature and commutator are generally spaced apart from each other axially along the motor shaft and wired in a manner to function as part of the motor. The armature is mounted to the motor shaft within a magnetic field. The armature is usually rotatably supported on the shaft by bearings. Consequently, a typical motor design includes one rotating armature. What is needed is an axle drive apparatus that is inexpensive to build with two separate armatures that independently rotate within one or two magnetic fields using a continuous common structure assembly.

SUMMARY OF THE INVENTION

It is an aspect of the claimed invention to provide an inexpensive axle apparatus with dual driven output shafts.

It is another aspect of the claimed invention to provide a dual drive axle apparatus sharing one or two magnetic fields.

It is yet another aspect of the claimed invention to provide a dual drive axle apparatus with two independently controlled armatures.

An axle drive apparatus includes a first rotor assembly with a first output shaft and a second rotor assembly with a second output shaft for providing independent rotation of the first and second output shafts. There also includes a first and second conductive assembly for, respectively, conducting electrical current into a inducing rotation of the first and the second rotor. Finally, an axial housing commonly connects the first and second rotor and the first and second brush card assembly.

A method of operating an axle drive apparatus includes supplying current to a first conductive and second conductive assembly, respectively, to conduct the current into and inducing rotation of a first and second rotor assembly. Then the axle drive is operated by engaging a first rotor assembly and a second rotor assembly, respectively, providing independent rotation of a first and a second output shaft.

These and other aspects of the invention will become apparent from the following description, the description being used to illustrate a preferred embodiments of the invention when read in conjunction with the accompanying drawings.

DETAILED DESCRIPTION OF THE INVENTION

While the claimed invention is described below with reference to a wheel chair with dual drive, a practitioner in the art will recognize the principles of the claimed invention are viable to other applications.

Figure 3:
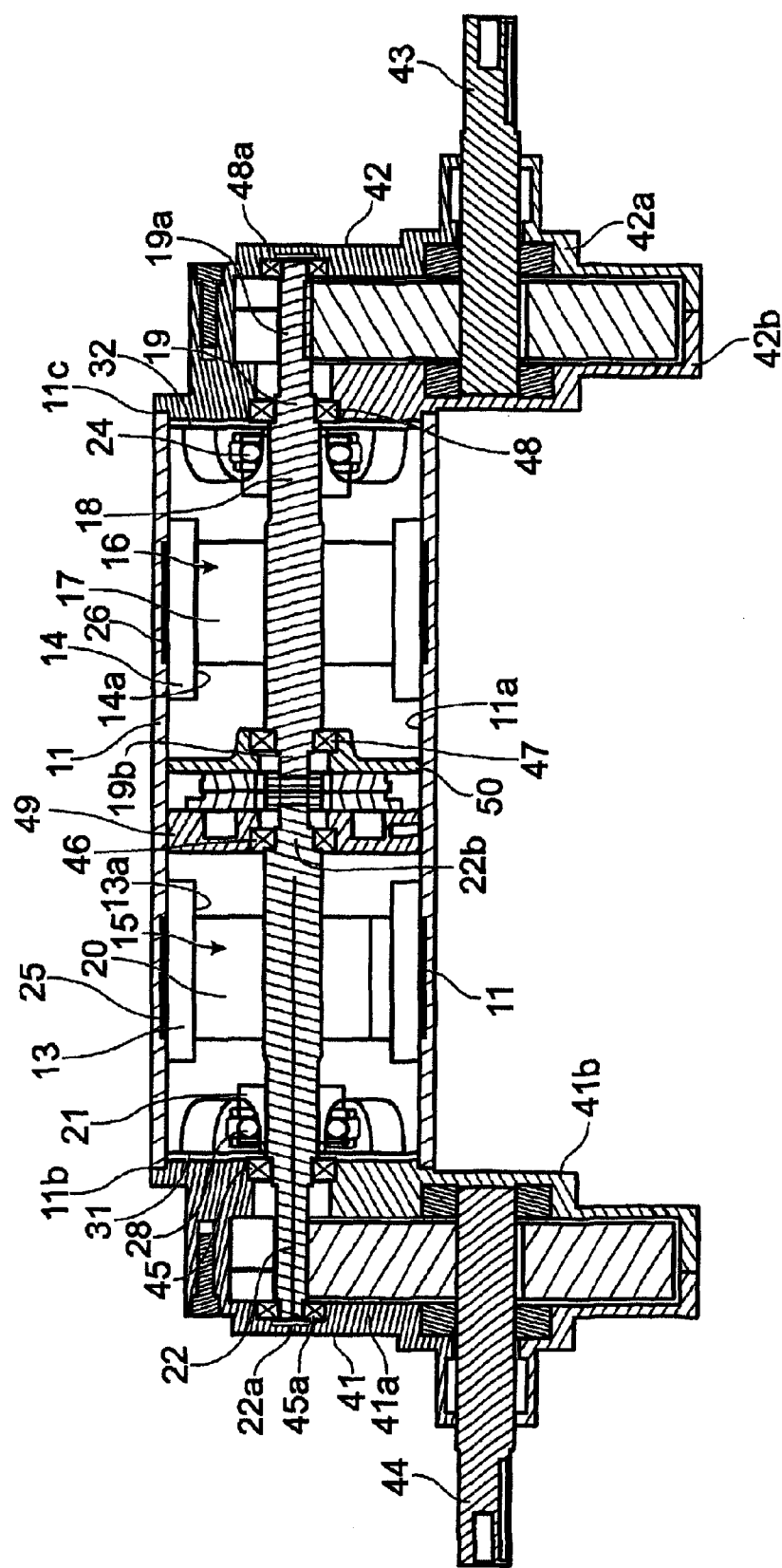
FIG. 3 shows components of the preferred embodiment of the invention.
Figure 4:
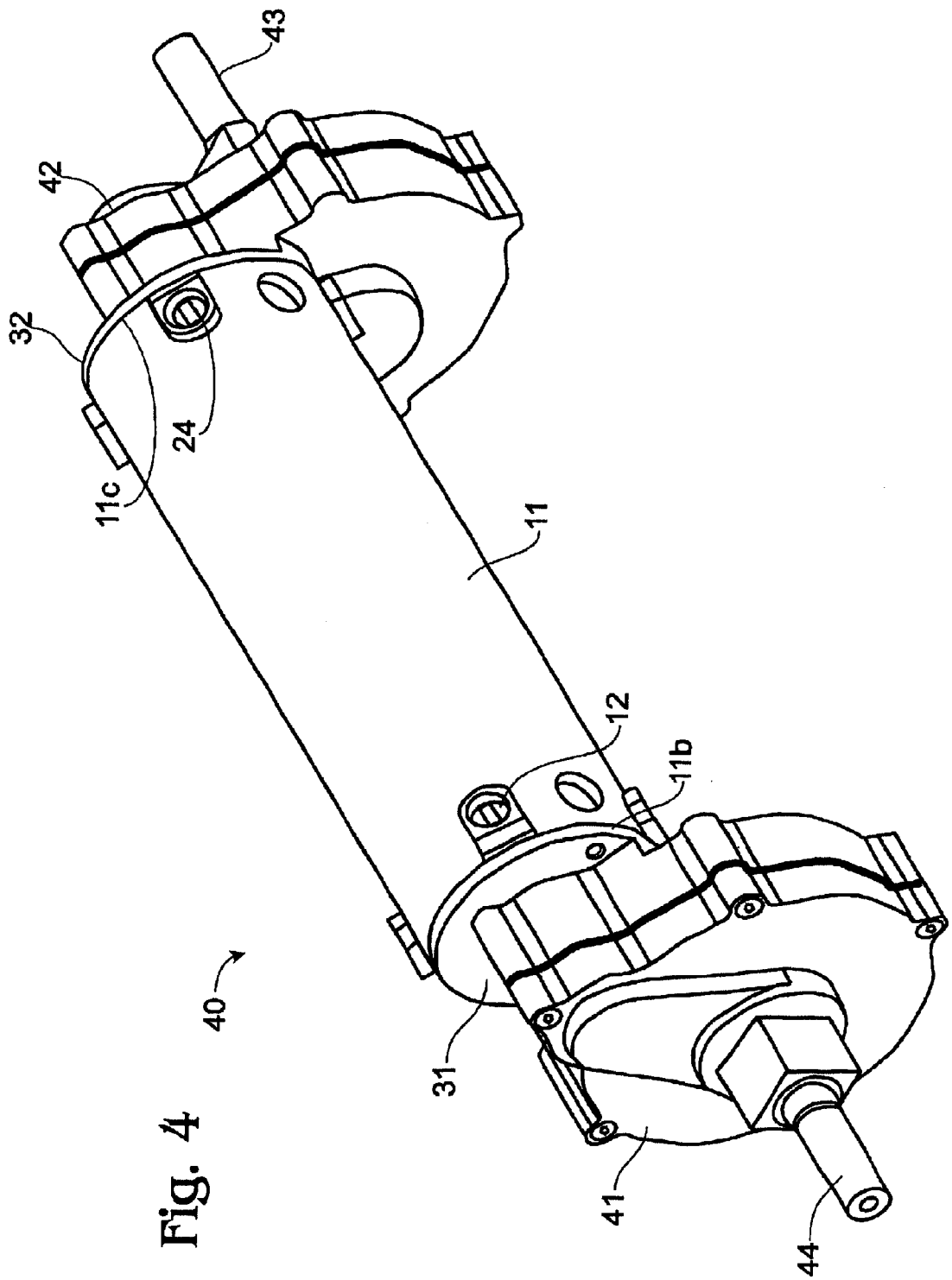
FIG. 4 shows an isometric drawing of the preferred embodiment of the invention.

In FIG. 4, a powered axle drive assembly, apparatus 40, shows an isometric view of the preferred embodiment of the invention with the combination of the axle-drive housing 11, the first gearbox 41, and the second gearbox 42. The first end 11b of axle-drive housing 11 communicates with a first end plate 31 that further communicates with the first gearbox 41. The second end 11c of axle drive housing 11 communicate with a second end plate 32 that further communicates with a second gearbox 42. Furthermore, the side of the first end plate 31 that touches the first end 11b is connected a first brush card assembly 12, while the side of the second end plate 32 that touches the second end 11c is connected a second brush card assembly 24. It is shown the first brush card assembly 12 and the second brush card assembly 24 project into the axle-drive housing 11 that allows them to be properly positioned and fitted to the axle-drive housing 11. A second output shaft 43 rotates independent of a first output shaft 44. Furthermore, the second output shaft 43 is capable of rotating in the opposition direction from the first output shaft 44. Internally, as shown in FIG. 3, are the powered axle drive components allowing the independent rotation of the first output shaft 44 and the second output shaft 43..

Figure 1:
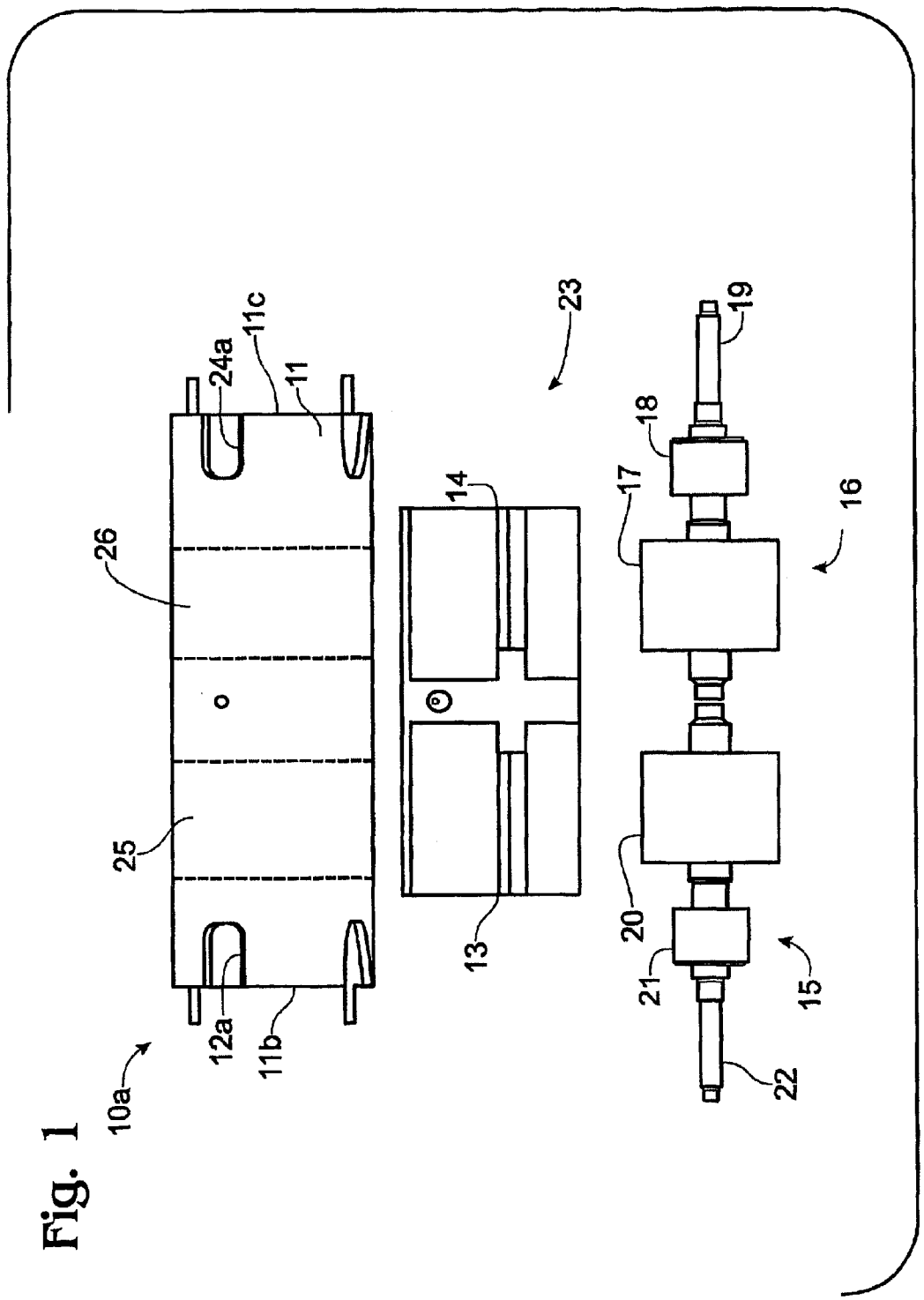
FIG. 1 shows individual components that are a part of the preferred embodiment of the invention.

Now referring to FIG. 1 it shows components 10a that are separate pieces of the preferred embodiment of the invention. The rotor assembly 15 and rotor assembly 16 fit into the magnet assembly 23 that further fit into axle-drive housing 11. The components 10a are for a DC motor but are also available for AC motor applications with the required modifications.

The axle-drive housing 11 contains a first conductive brush card assembly recessed surface 12a on a first end 11b, and a second conductive brush card assembly recessed surface 24a on a second end 11c. This allows a first conductive brush card assembly 12, and second conductive brush card assembly 24, as shown in FIG. 4, to properly fit into axle-drive housing 11 when they are assembled in the housing The housing material is metal, plastic or molded resin depending upon the desired application. However, the preferred embodiment of the invention uses a metal axle-drive housing 11. If a non-metallic axle-drive housing 11 is used, then it additionally contains a first metallic flux ring 25 and a second metallic flux ring 26, communicating circumferentially with the inside of axle-drive housing 11. The first metallic flux ring 25 and the second metallic flux ring 26 correspond, respectively, to a first magnet set 13 and a second magnet set 14. As is known to the practitioner in the art the metallic flux ring is substituted for the loss of conduction present in the non-metallic axle-drive housing 11.

The magnet assembly 23 includes magnet set 13 and magnet set 14 creating two independent magnetic fields. The magnets are a solid material and consist of one of the following: ceramic, samarium cobalt, neodymium iron boron, alnico, bonded ferrite, bonded neodymium, and bonded samarium cobalt. Furthermore, each magnet set includes a plurality of magnets and magnetic poles depending on the design criteria. Finally, the magnet assembly in another embodiment of the invention combines magnet set 13 and magnet set 14 into one set creating one magnetic field.

The first rotor assembly 15 includes a first co-axial armature core 20, a first commutator 21 assembled on a first shaft 22. The second rotor assembly 16 includes a second co-axial armature core 17, a second commutator 18 assembled on a second shaft 19. The rotor assemble 15 and rotor assembly 16 acts independently, receives separate independent signals from an external controller. The armature core and commutator are constructed as one skilled in the art would typically find in other DC motor applications. However, the armature core and commutator can be designed to work in AC motor applications.

Figure 2:
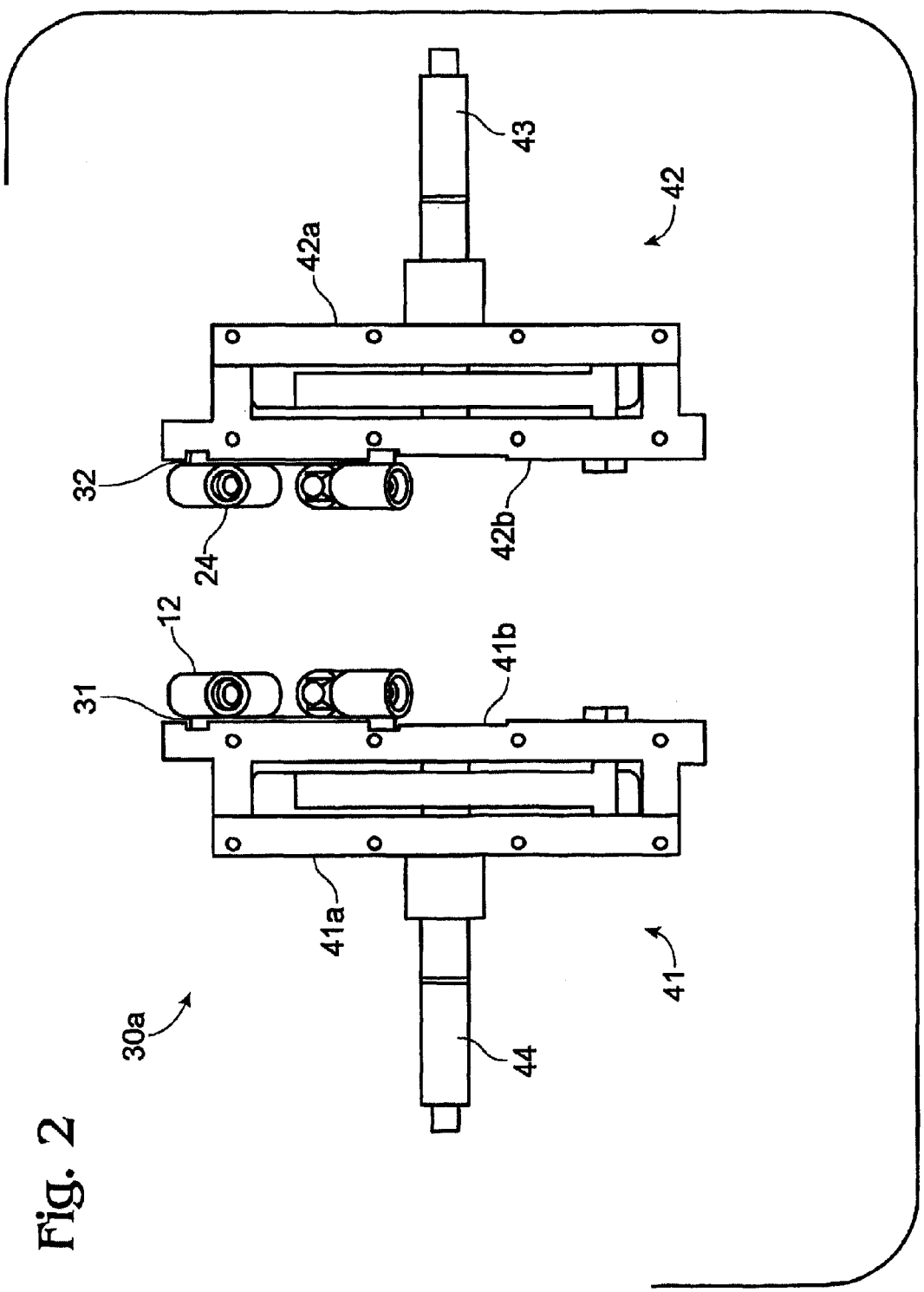
FIG. 2 shows the assembly of the preferred embodiment of the invention.

FIG. 2 shows component 30a as designed for use in the preferred embodiment of the invention. The component 30a includes a first gearbox housing 41a that mounts with a second gearbox housing 41b of the first gearbox 41, and a third gearbox housing 42a mounts with a fourth gearbox housing 42b of a second gearbox 42. The first gearbox 41 has a first out put shaft 44. The second gearbox 42 has a second output shaft 43. The first gearbox housing 41a has securely connected a first end plate 31 that securely connects a first conductive brush card assembly 12. The third gearbox housing 42a is securely connected to a second end plate 32 that securely connects a second brush card assembly 24. The second gearbox housing 41b, with its assembly, communicates with a first end 11b of axle-drive housing 11 that is shown in FIG. 1. The fourth gearbox housing 42b, with its assembly, communicates with a second end 11c of axle-drive housing 11 that is shown in FIG. 1.

FIG. 3 shows axle drive apparatus 10 that is the assembly of the preferred embodiment of the invention, and include the assembly components 10a that are shown in FIG. 1. The first magnet set 13 and the second magnet set 14 communicate with the internal surface 11a of axle-drive housing 11. The first armature core 20, of the first rotor assembly 15, revolves within a first internal surface 13a of first magnet set 13. The second armature core 17, of the second rotor assembly 16, revolves within a second internal surface 14a of the second magnet set 14.

The first end 11b of axle-drive housing 11 is connected to a first gearbox 41 with a first armature shaft 22 inserted into the first gearbox 41. The second end 11c of axle-drive housing 11 is connected to a second gearbox 42 with a second armature shaft 19 inserted into the second gearbox 42. A first end plate 31 that mounts a first conductive brush card assembly 12 communicates with the first gearbox 41 and the first end 11b of axle-drive housing 11. A second end plate 32 that mounts a second conductive brush card assembly 24 communicates with a second gearbox 42 and the second end 11c of axle-drive housing 11. Furthermore, a first shaft bearing housing 49 securely connects a first bearing 46 that further rotatably connects to the first shat 22 second end 22b. The first bearing housing 49 communicates with the internal surface 11a of axle-drive housing 11. The second bearing housing 50 securely connects a second bearing 47 that further rotatably connects to the second shaft 19 fourth end 19b. The second bearing housing 50 communicates with the internal surface 11a of axle-drive housing 11. Finally, a first gearbox bearing 45 and a second gearbox bearing 45a rotatably secure the first shaft 22, first end 22a, to the first gearbox 41. The third gearbox bearing 48 and a fourth gearbox bearing 48a rotatably secure the second shaft 19, third end 19a, to the second gearbox 42.

The first conductive brush card assembly 12 is controlled independently from the second conductive brush card assembly 24. The first rotor assembly is energized by the first conductive brush card assembly 12 that receives a first signal from an external controller. The second rotor assembly 16 is energized by the second conductive brush card assembly 24 that receives a second signal from an external controller. A practitioner in the art fully understands that each rotor assembly can be energized by a brush card containing multiple poles, or substituted for a conductive brushless card assembly, depending on the application. The preferred embodiment of the invention is a DC voltage design. However, AC line voltage is another option for axle drive apparatus 10.

Independent control, along with the two magnetic fields, allows the building of a low-cost and efficient axle drive apparatus. The independent control of each rotor eliminates the need for separate motors in devices, for example, which require wheels to rotate at different speeds or different directions. The speed of the first rotor assembly 15 and the second rotor assembly 16 are increased/decreased by varying its voltage, which is supplied through independent signals from an external controller. The controller varies the direction of the rotation of the first rotor assembly 15 and second rotor assembly 16, allowing one rotor assembly to rotate clockwise while the other rotor assembly rotates counter-clockwise or in a reverse direction. Furthermore, the external controller will vary the direction of the first and second rotor assembly allowing both to rotate clockwise or counter-clockwise at the same time.

The first gearbox bearing 45 and second gearbox bearing 45a are generally lubricated from gearbox grease internal to the first gearbox 41. The third gearbox bearing 48 and fourth gearbox bearing 48a are generally lubricated from gearbox grease internal to the second gearbox. A practitioner in the art fully understands that with some modification to the gearbox design, gearbox oil is substituted for grease in different applications.

The first gearbox bearing 45, of the first gearbox 41, connects to the second gearbox housing 41b by a slip fit. The second gearbox bearing 45a, of the first gearbox 41, connects to the first gearbox housing 41a by a slip fit. The first end 22a, of the first shaft 22, connects to the first gearbox bearing 45 and to the second gearbox bearing 45a by interference fit. The second gearbox housing 41b is securely connected to the first end 11b of axle-drive housing 11. The first gearbox housing 41a is connected to the second gearbox housing 41b. The third gearbox bearing 48, of the second gearbox 42, connects to the fourth gearbox housing 42b by slip fit. The fourth gearbox bearing 48a, of the second gearbox 42, connects to the third gearbox housing 42a by a slip fit. The third end 19a, of the second shaft 19 connects to the third gearbox bearing 48 and fourth gearbox bearing 48a by an interference fit. The fourth gearbox housing 42b is securely connected to the second end 11c of axle-drive housing 11. Finally, the third gearbox housing 42a is connected to the fourth gearbox housing 42b. A practitioner in the art fully understands that the first gearbox 41 and the second gearbox 42 are substitutable for other combinations including, but not limited to, pulleys with drive belts connected to the first shaft 22 and the second shaft 19, and sprockets with drive chains connected to the first shaft 22 and the second shaft 19.

The first bearing 46 and second bearing 47 are typically ball type bearings that are sealed requiring no additional lubrication. The bearings in other embodiments include, but are not limited to needle, roller, tapered, or self-aligning, depending on the application and duty requirements. The first bearing 46 is connected to a first bearing housing 49 by a slip fit. The second end 22b, of the first shaft 22, is connected to the first bearing 46 by an interference fit. The second bearing 47 is connected to the second bearing housing 50 by a slip fit. Furthermore, the fourth end 19b, of the second shaft 19 is connected to the second bearing 47 by an interference fit. While the first bearing housing 49 and the second bearing housing 50 slip into axle-drive housing 11, the first end plate 31 and second end plate 32 are securely connected to axle-drive housing 11. In another embodiment of this invention the first bearing housing 49 and the second bearing housing 50 are securely connected to axle-drive housing 11.

In FIG. 3 axle drive apparatus 10 is operated by engaging a first rotor assembly within a common magnetic field providing independent rotation when the magnet assembly and first rotor commutator are energized, and by engaging a second rotor assembly within a common magnetic field providing independent rotation when the magnet assembly and second rotor commutator are energized. Supplying a current to a first conductive brush in communication with a first rotor commutator energizes the first rotor. Supplying a current to a second conductive brush in communication with a second rotor commutator energizes the second rotor. Engaging a first brush card in an external controller to provide a first independent signal to the first conductive brush allows independent operation of the first rotor. Engaging a second brush card in an external controller to provide a second independent signal to the second conductive brush allows independent operation of the second rotor.

Referring back to FIGS. 1 through 4, a practitioner in the art will readily see many applications of the claimed invention. The preferred embodiment of the invention is available for use on a plurality of transportation devices including, but not limited to, wheel chairs, floor cleaners, equipment movers, personnel vehicles, material handling systems, and the like. The axle-drive apparatus eliminates the need for additional mechanical assemblies associated with systems requiring two individual motors along with the independent motors.

While there has been illustrated and described what is at present to be a preferred embodiment of the claimed invention, it will be appreciated that numerous changes and modifications are likely to occur to those skilled in the art. It is intended in the appended claims to cover all those changes and modifications that fall within the spirit and scope of the claimed invention.

What is claimed is:

1. A powered axle-drive apparatus comprising:
   a) a first rotor assembly with a first output shaft for providing independent rotation of said first output shaft;
   b) a second rotor assembly with a second output shaft for providing independent rotation of said second output shaft;
   c) a first conductive assembly for conducting electrical current into and inducing rotation of said first rotor assembly;
   d) a second conductive assembly for conducting electrical current into and inducing rotation of said second rotor assembly; and
   e) an axle-drive housing for commonly connecting said first and second rotor and said first and second brush card assembly.

2. The powered axle-drive apparatus as claimed in claim 1, wherein said first rotor assembly is connected to a first gearbox and said second rotor assembly is connected to a second gearbox.

3. The powered axle-drive apparatus as claimed in claim 1, wherein said first and second gearbox are substituted with a pulley and drive belt combination.

4. The powered axle-drive apparatus as claimed in claim 1, wherein said first and second gearbox are substituted with a sprocket and drive chain combination.

5. The powered axle-drive apparatus as claimed in claim 1, wherein said axle-drive housing is selected from that group consisting of metal, plastic, and molded resin.

6. The axle-drive apparatus as claimed in claim 1, wherein said rotor is supplied DC current.

7. The axle-drive apparatus as claimed in claim 1, wherein said rotor is supplied AC current.

8. The axle-drive apparatus as claimed in claim 1, wherein said first and second rotors are independent of each other.

9. The axle-drive apparatus as claimed in claim 1, wherein said first rotor revolves within a first magnet set.

10. The axle-drive apparatus as claimed in claim 1, wherein said second rotor revolves within a second magnet set.

11. The axle-drive apparatus as claimed in claim 10, wherein said second magnet set is a plurality of magnets.

12. The axle-drive apparatus as claimed in claim 10, wherein said magnets are selected from the group consisting of ceramic, samarium cobalt, neodymium iron boron, alnico, bonded ferrite, bonded neodymium, and bonded samarium cobalt.

13. The axle-drive apparatus as claimed in claim 9, wherein said first magnet set is a plurality of magnets.

14. The axle-drive apparatus as claimed in claim 9, wherein said magnets are selected from the group consisting of ceramic, samarium cobalt, neodymium iron boron, alnico, bonded ferrite, bonded neodymium, and bonded samarium cobalt.

15. The axle-drive apparatus as claimed in claim 1, wherein said first and second rotor revolve within a common set of magnets.

16. The axle-drive apparatus as claimed in claim 15, wherein said common set of magnets is a plurality of magnets.

17. The axle-drive apparatus as claimed in claim 15, wherein said magnets are selected from the group consisting of ceramic, samarium cobalt, neodymium iron boron, alnico, bonded ferrite, bonded neodymium, and bonded samarium cobalt.

18. The axle-drive apparatus as claimed in claim 1, wherein said first and second conductive assembly is selected from the group consisting of a brush card, and brushless card.

19. The axle-drive apparatus as claimed in claim 1, wherein said first conductive brush card assembly further comprises multiple poles.

20. The axle-drive apparatus as claimed in claim 1, wherein said second conductive brush card assembly further comprises multiple poles.

21. The axle-drive apparatus as claimed in claim 1, wherein said axle drive housing further comprises a first and second flux ring when said housing material is metallic and conductive.

22. A method of operating a powered axle drive apparatus comprising:

a) supplying current to a first conductive assembly for conducting electrical current into and inducing rotation of a first rotor assembly;

b) supplying current to a second conductive assembly for conducting electrical current into and inducing rotation of a second rotor assembly;

c) engaging said first rotor assembly with a first output shaft for providing independent rotation of said first output shaft; and d) engaging said second rotor assembly with a second output shaft for providing independent rotation of said second output shaft.

23. The method of operating the powered axle-drive apparatus as claimed in claim 22, wherein said first rotor assembly is connected to a first gearbox and said second rotor assembly is connected to a second gearbox.

24. The method of operating the powered axle-drive apparatus as claimed in claim 22, wherein said first and second gearbox are substituted with a pulley and drive belt combination.

25. The method of operating the powered axle-drive apparatus as claimed in claim 22, wherein said first and second gearbox are substituted with a sprocket and drive chain combination.

26. The method of operating the powered axle-drive apparatus as claimed in claim 22, wherein said axle-drive housing is selected from that group consisting of metal, plastic, and molded resin.

27. The method of operating the powered axle-drive apparatus as claimed in claim 22, wherein said rotor is supplied DC current.

28. The method of operating the powered axle-drive apparatus as claimed in claim 22, wherein said rotor is supplied AC current.

29. The method of operating the powered axle-drive apparatus as claimed in claim 22, wherein said first and second rotors are independent of each other.

30. The method of operating the powered axle-drive apparatus as claimed in claim 22, wherein said first rotor revolves within a first magnet set.

31. The method of operating the powered axle-drive apparatus as claimed in claim 30, wherein said first magnet set is a plurality of magnets.

32. The method of operating the powered axle-drive apparatus as claimed in claim 30, wherein said magnets are selected from the group consisting of ceramic, samarium cobalt, neodymium iron boron, alnico, bonded ferrite, bonded neodymium, and bonded samarium cobalt.

33. The method of operating the powered axle-drive apparatus as claimed in claim 22, wherein said second rotor revolves within a second magnet set.

34. The method of operating the powered axle-drive apparatus as claimed in claim 33, wherein said second magnet set is a plurality of magnets.

35. The method of operating the powered axle-drive apparatus as claimed in claim 33, wherein said magnets are selected from the group consisting of ceramic, samarium cobalt, neodymium iron boron, alnico, bonded ferrite, bonded neodymium, and bonded samarium cobalt.

36. The method of operating the powered axle-drive apparatus as claimed in claim 22, wherein said first and second rotor revolve within a common set of magnets.

37. The method of operating the powered axle-drive apparatus as claimed in claim 36, wherein said common set of magnets is a plurality of magnets.

38. The method of operating the powered axle-drive apparatus as claimed in claim 36, wherein said magnets are selected from the group consisting of ceramic, samarium cobalt, neodymium iron boron, alnico, bonded ferrite, bonded neodymium, and bonded samarium cobalt.

39. The method of operating the powered axle-drive apparatus as claimed in claim 22, wherein said first and second conductive assembly is selected from the group consisting of a brush card, and a brushless card.

40. The method of operating the powered axle-drive apparatus as claimed in claim 22, wherein said first conductive brush card assembly further comprises multiple poles.

41. The method of operating the powered axle-drive apparatus as claimed in claim 22, wherein said second conductive brush card assembly further comprises multiple poles.

42. The method of operating the powered axle-drive apparatus as claimed in claim 22, wherein said axle drive housing further comprises a first and second flux ring when said housing material is metallic and conductive.

* * * * *